(12) United States Patent
Oikarinen

(10) Patent No.: US 8,549,010 B2
(45) Date of Patent: Oct. 1, 2013

(54) METHOD AND APPARATUS FOR PROVIDING DISTRIBUTED KEY RANGE MANAGEMENT

(75) Inventor: Matti Juhani Oikarinen, Burlington, MA (US)

(73) Assignee: Nokia Corporation, Espoo (FI)

( * ) Notice: Subject to any disclaimer, the term of this patent is extended or adjusted under 35 U.S.C. 154(b) by 140 days.

(21) Appl. No.: 13/107,150

(22) Filed: May 13, 2011

(65) Prior Publication Data
US 2012/0290582 A1    Nov. 15, 2012

(51) Int. Cl.
*G06F 17/30*    (2006.01)
(52) U.S. Cl.
USPC .......................................... 707/741
(58) Field of Classification Search
USPC ............ 707/741, 700, 702, 720, 713, 609, 707/999.205; 709/217, 238, 242; 711/100, 711/147, 153, 173, 217, 144
See application file for complete search history.

(56) References Cited

U.S. PATENT DOCUMENTS

| 7,613,703 | B2 | 11/2009 | Kakivaya et al. | |
|---|---|---|---|---|
| 7,917,495 | B1 * | 3/2011 | Chapman et al. | 707/713 |
| 7,921,132 | B2 | 4/2011 | Uppala | |
| 7,941,401 | B2 | 5/2011 | Okamoto | |
| 7,958,088 | B2 | 6/2011 | Yermeni et al. | |
| 2006/0193289 | A1 * | 8/2006 | Ronneke et al. | 370/329 |
| 2006/0268795 | A1 * | 11/2006 | Tamaki | 370/338 |
| 2006/0277180 | A1 * | 12/2006 | Okamoto | 707/7 |
| 2007/0143442 | A1 * | 6/2007 | Zhang et al. | 709/217 |
| 2008/0201336 | A1 | 8/2008 | Yamoto | |
| 2010/0011098 | A1 * | 1/2010 | Sanborn et al. | 709/223 |
| 2010/0106915 | A1 * | 4/2010 | Krishnaprasad et al. | 711/144 |
| 2011/0191389 | A1 * | 8/2011 | Okamoto | 707/809 |
| 2011/0282832 | A1 * | 11/2011 | Rishel et al. | 707/609 |

OTHER PUBLICATIONS

Chang et al., "Bigtable: A Distributed Storage System for Structured Data," http://static.googleusercontent.com/external_content/untrusted_dlcp/labs.google.com/en/us/papers/bigtable-o 2006.

* cited by examiner

*Primary Examiner* — Hung T Vy
(74) *Attorney, Agent, or Firm* — Ditthavong Mori & Steiner, P.C.

(57) ABSTRACT

An approach is provided for providing distributed key range management. A key management platform determines to rebalance a node for storing a key value range by splitting at least one other node from the node, wherein the at least one other node stores at least a portion of the key value range. The key management platform also causes, at least in part, a creation of one or more node lists for the node, the at least one other node, or a combination thereof. The key management platform further causes, at least in part, a storage of the one or more node lists at the node and the at least one other node, wherein any one of the one or more node lists can be used to initiate a routing of one or more requests between the node and the at least one other node to operate on the key value range.

18 Claims, 11 Drawing Sheets

300

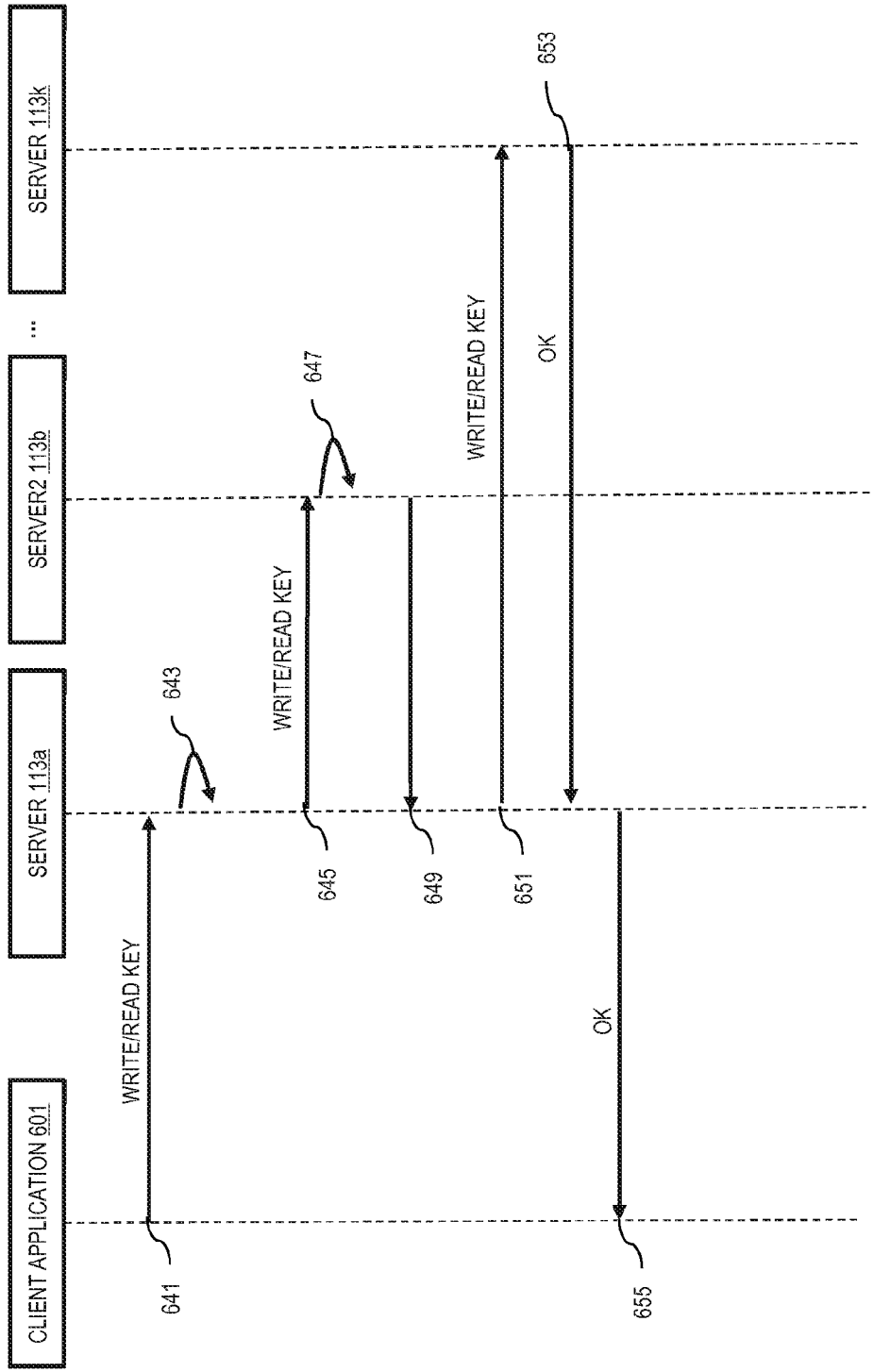

METHOD AND APPARATUS FOR PROVIDING DISTRIBUTED KEY RANGE MANAGEMENT

BACKGROUND

Many people now are using mobile devices with various methods of connectivity as the primary gateway to the Internet and also as major storage points for personal information. This is in addition to the normal range of personal computers, associated sensors, and Internet-based providers of information. Combining these devices together, in addition to the applications on the devices and the information stored by those applications, is a major challenge of interoperability. This can be achieved through numerous, individual and personal distributed spaces of information and computations in which persons, groups of persons, etc. can place, share, interact and manipulate (or program devices to automatically perform the planning, interaction and manipulation of) webs of distributed information and/or computations with their own locally agreed semantics without necessarily conforming to an unobtainable, global whole.

On the other hand, in order to improve manageability, performance and availability of the information, these distributed information spaces are built based on large-scale distributed data storages (e.g., databases) that can scale to petabytes or even larger with the capability of maintaining ordered access keys. However, the existing architectures for distributed database management, such as, for example, Google BigTable®, Cassandra®, HBase®, etc. require centralized management of key ranges. Although the central key management approaches are capable of distributed key rebalancing, however the key rebalancing processes of these approaches are localized by each server. As a result, the key management process may create system bottlenecks that in turn will limit system scalability, performance and availability, as a centralized process creates a single point of failure.

SOME EXAMPLE EMBODIMENTS

Therefore, there is a need for an approach for distributed key management so that the keys can be distributed to nodes in their natural order and, as a result, the key ranges can be accessed more efficiently.

According to one embodiment, a method comprises determining to rebalance a node for storing a key value range by splitting at least one other node from the node, wherein the at least one other node stores at least a portion of the key value range. The method also comprises causing, at least in part, a creation of one or more node lists for the node, the at least one other node, or a combination thereof. The method further comprises causing, at least in part, a storage of the one or more node lists at the node and the at least one other node, wherein any one of the one or more node lists can be used to initiate a routing of one or more requests between the node and the at least one other node to operate on the key value range.

According to another embodiment, an apparatus comprises at least one processor, and at least one memory including computer program code for one or more programs, the at least one memory and the computer program code configured to, with the at least one processor, cause, at least in part, the apparatus to determine to rebalance a node for storing a key value range by splitting at least one other node from the node, wherein the at least one other node stores at least a portion of the key value range. The apparatus is also caused to create one or more node lists for the node, the at least one other node, or a combination thereof. The apparatus is further caused to store the one or more node lists at the node and the at least one other node, wherein any one of the one or more node lists can be used to initiate a routing of one or more requests between the node and the at least one other node to operate on the key value range.

According to another embodiment, a computer-readable storage medium carries one or more sequences of one or more instructions which, when executed by one or more processors, cause, at least in part, an apparatus to determine to rebalance a node for storing a key value range by splitting at least one other node from the node, wherein the at least one other node stores at least a portion of the key value range. The apparatus is also caused to create one or more node lists for the node, the at least one other node, or a combination thereof. The apparatus is further caused to store the one or more node lists at the node and the at least one other node, wherein any one of the one or more node lists can be used to initiate a routing of one or more requests between the node and the at least one other node to operate on the key value range.

According to another embodiment, an apparatus comprises means for determining to rebalance a node for storing a key value range by splitting at least one other node from the node, wherein the at least one other node stores at least a portion of the key value range. The apparatus also comprises means for causing, at least in part, a creation of one or more node lists for the node, the at least one other node, or a combination thereof. The apparatus further comprises means for causing, at least in part, a storage of the one or more node lists at the node and the at least one other node, wherein any one of the one or more node lists can be used to initiate a routing of one or more requests between the node and the at least one other node to operate on the key value range.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A-6C are diagrams of sequences for locating nodes, according to various embodiments;

DESCRIPTION OF SOME EMBODIMENTS

Examples of a method, apparatus, and computer program for providing distributed key range management are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
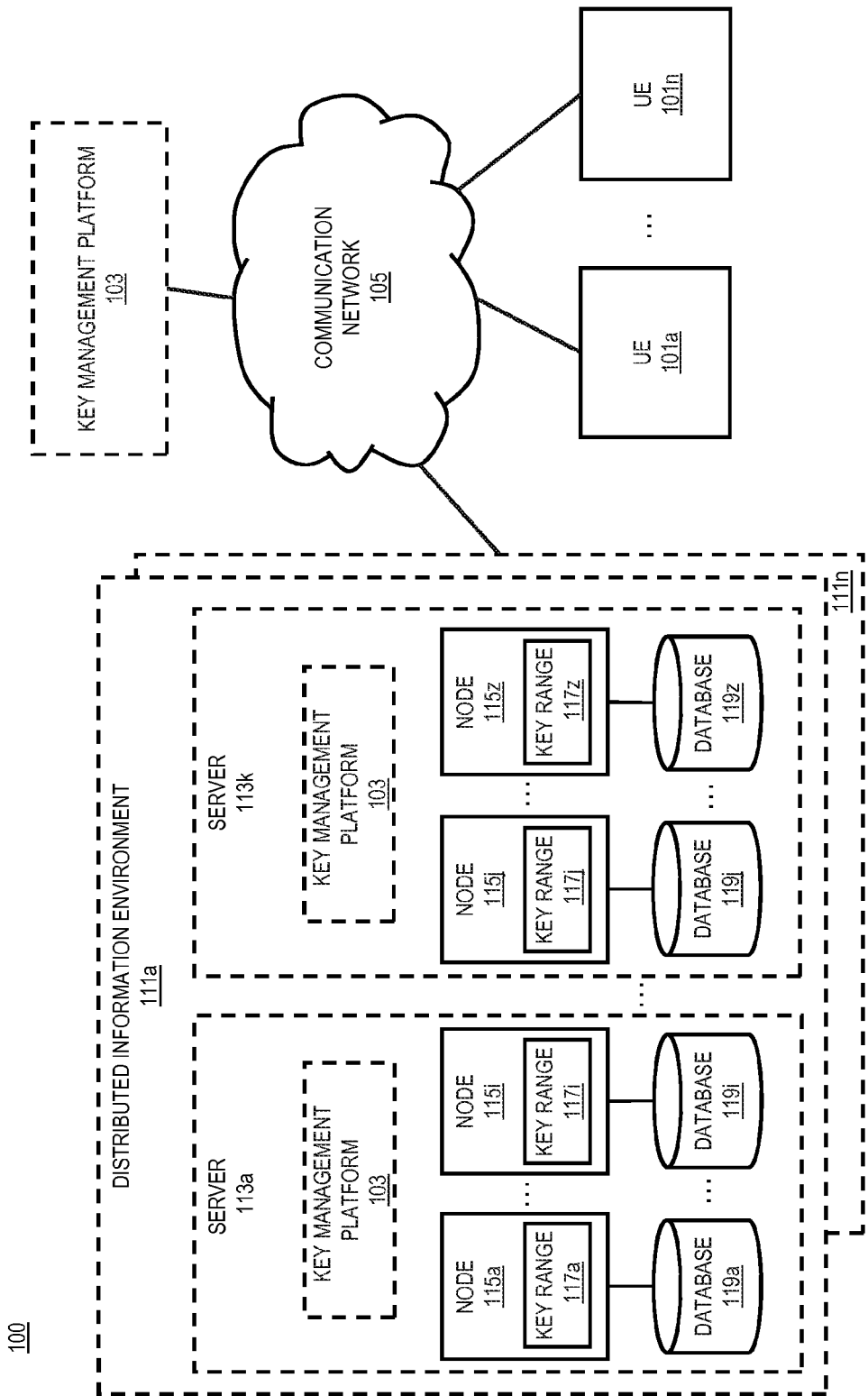
FIG. 1 is a diagram of a system capable of providing distributed key range management, according to one embodiment.

FIG. 1 is a diagram of a system capable of providing distributed key range management, according to one embodiment. Recent developments in information technology and telecommunication have lead to the introduction of distributed information environments $111a$-$111n$, wherein information can be stored in distributed databases $119a$-$119i$ or $119j$-$119z$ in multiple devices located in the same physical location, dispersed over a network of interconnected devices or a combination thereof. These distributed sources of data and information ($119a$-$119i$ or $119j$-$119z$) are managed and maintained by certain types of management systems (e.g., clouds, information spaces, etc.) that make the distribution transparent to the users by providing timely access to the requested information, even in conditions where the requested information is composed of multiple components that may be distributed over a wide spectrum of distributed networks (e.g., the World Wide Web). In a distributed database system, each component (e.g., partition) of the database may be spread over multiple servers $113a$-$113k$, wherein each server includes one or more key ranges $117a$-$117i$ or $117j$-$117z$. Additionally, each server $113a$-$113k$ maintains one or more nodes $115a$-$115i$ or $115j$-$115z$ that represent the key ranges and lookup structures for key ranges $117a$-$117i$ or $117j$-$117z$ located inside the server itself and other servers.

Current distributed database management systems provide different criteria for splitting a database into multiple distributed partitions by using partitioning keys, wherein a partitioning key is composed of one or more data elements determining the partition in which a particular data component is stored. A good partitioning key is one that spreads the data as evenly as possible across all database partitions that may be located on distributed nodes associated with distributed servers.

In one embodiment, database partitioning may be performed based on range partitioning criteria, wherein each partition is selected by determining if the partitioning key is inside a certain range (e.g., the data records may be partitioned based on a certain range value of one or more data items).

The currently used distributed database management systems such as, for example, Google BigTable® (a distributed storage system for managing structured data that is designed to scale to a very large size), Cassandra® (an Apache highly scalable second-generation distributed database that brings together fully distributed design and a Column Family-based data model), HBase® (an open source, non-relational, distributed database modeled after Google BigTable® developed as part of the Apache Software Foundation's Hadoop® project and runs on top of a Hadoop Distributed File system), etc. use range based partitioning. However, range reads of keys are cost efficient only when keys next to each other are stored in the same physical server. Range reads are used for processes such as, for example, geospatial search, inversed lookup searches, etc. For instance, in a search for finding users whose first names start with the phrase "Mar" (shown as "Mar*"), all the names in the range "Mar" to "Mas" can be read.

It is noted that existing range read solutions such as, for example, Lucandra/Solandra®, which is a Cassandra based backend for Lucene® (an open source information retrieval software library), store free text indexes in ordered databases. These free text indexes can be scaled efficiently when keys are stored in order. For example a key may be a term used for document mapping of the free text indexes. All of these solutions provide a storage that has keys ordered, but require centralized management of key ranges. Some of the existing architectures require centralized nodes that can locate physical servers containing the data. However, these solutions fail to have data evenly balanced when keys are dense. This may lead to inefficient key access. Other architectures may store keys in order but lack the capability of key rebalancing.

To address this problem, a system 100 of FIG. 1 introduces the capability to provide distributed key range management. In one embodiment, the key management platform 103 distributes keys associated with the databases 119a-119i and 119j-119z to respective nodes 115i and 115j-115z of respective servers 113a-113k in their natural order. The ordered distribution of keys in key ranges 117a-117i and 117j-117z provides fast range reads, but at the same time the ordered distribution may lead to a creation of high congestion areas (e.g., hotspots) where significant amounts of range read occur. The hotspots may occur because ordered keys may not distribute evenly enough. It is noted that (as seen in FIG. 1) the key management platform 103 may consist of localized key managing components within the distributed information environments 111a-111n, within each server 113a-113k or a combination thereof. In other words, the key management platform 103 may very well have a distributed structure As shown in FIG. 1, the system 100 comprises user equipment (UEs) 101a-101n having connectivity to the distributed information environments 111a-111n and the key management platform 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, in order to overcome the occurrence of congested hotspots, more nodes can be created and added to the hotspots by the key management platform 103, similar to the solution used for the creation of Peer-to-Peer (P2P) distributed hash tables, wherein a distributed hash table is a hash table that partitions the key space and distributes the parts across a set of nodes.

In one embodiment, for any new content "c" added to the databases 119a-119i or 119j-119z, the key management platform 103 generates a key "k" and sends a message to any node 115a-115i or 115j-115z participating in the distributed key ranges via servers 113a-113k. This message is forwarded from node to node until it reaches a node 115m responsible for the generated key "k". The pair (k, c) of the generated key and the new content can then be stored such that the key "k" is stored in its key range 117m of node 115m and the content "c" stored in database 119a-119i or 119j-119z.

In one embodiment, any UE 101a-101n can retrieve the content "c" by generating the key "k" and querying any server 113a-113k, to find the content "c" associated with "k" with a message. It is noted that a key "k" is generated by a user of the distributed information within the distributed information environment 111a-111n. For example, the key "k" may be generated by a UE 101a-101n or any other entity using the distributed information. The message can again be routed, by the key management platform 103, through to the server 113i responsible for key "k", which replies with the stored content "c". The distributed key range can scale to large numbers of nodes and handle continual node arrivals and failures.

In one embodiment, the key management platform 103 may split each node 115a-115i or 115j-115z into two or more new nodes wherein each new node can consist of part of the key ranges 117a-117i or 117j-117z associated with nodes 115a-115i or 115j-115z. The splitting provides even distribution of keys (e.g., key rebalancing), which in turn provides even distribution of dense key spaces across the possible key ranges.

By way of example, the UE 101 and the key management platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each network node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
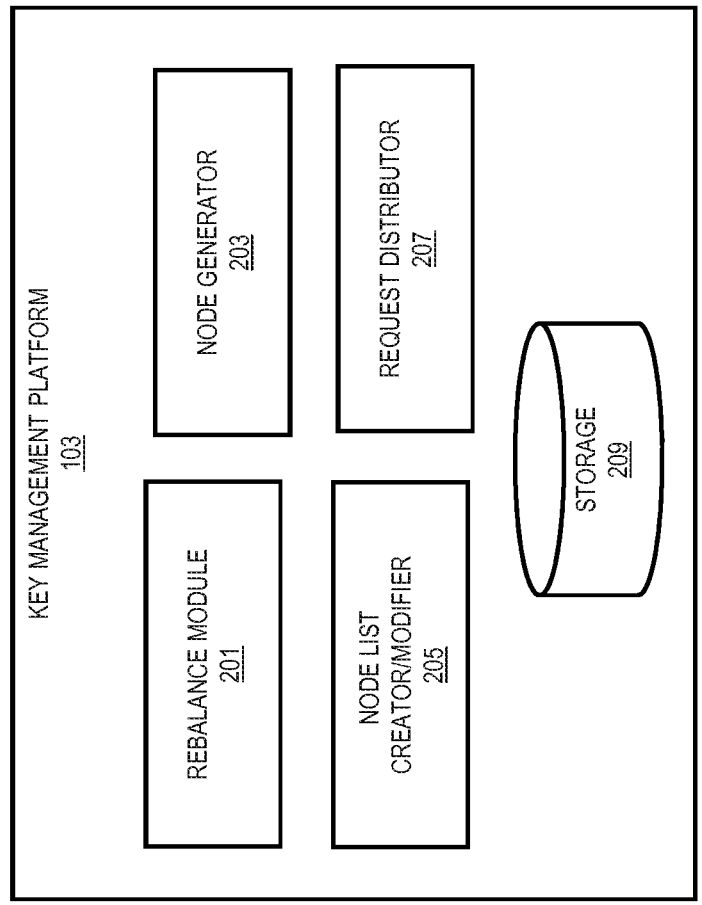
FIG. 2 is a diagram of the components of the key management platform, according to one embodiment.

FIG. 2 is a diagram of the components of the key management platform, according to one embodiment. By way of example, the key management platform 103 includes one or more components for providing distributed key range management. It is contemplated that the functions of these components may be combined in one or more components or performed by other components of equivalent functionality. In this embodiment, the key management platform 103 includes a rebalance module 201, a node generator 203, a node list creator/modifier 205, a request distributor 207 and a storage 209.

Figure 3:
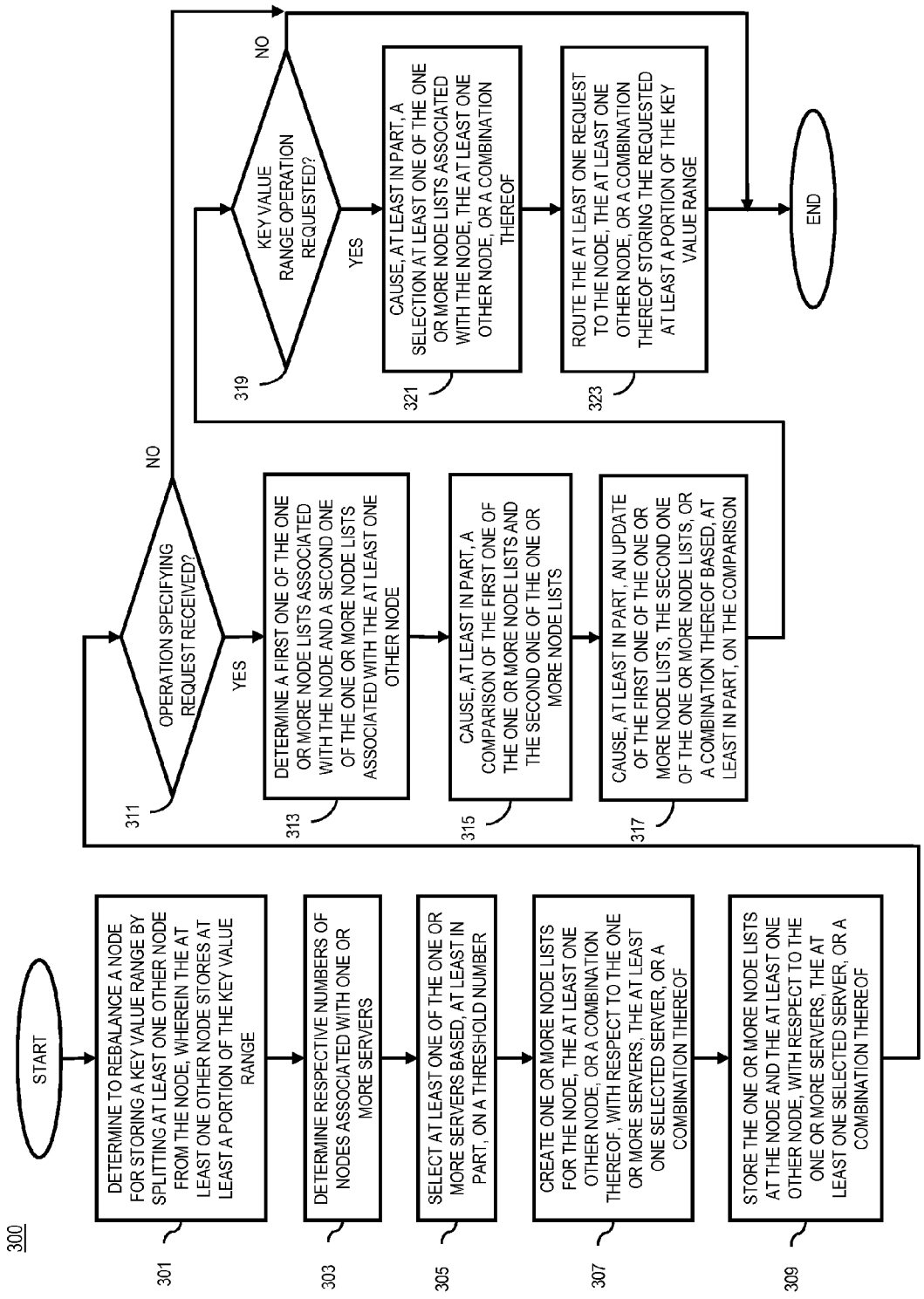
FIG. 3 is a flowchart of a process for providing distributed key range management, according to one embodiment.
Figure 8:
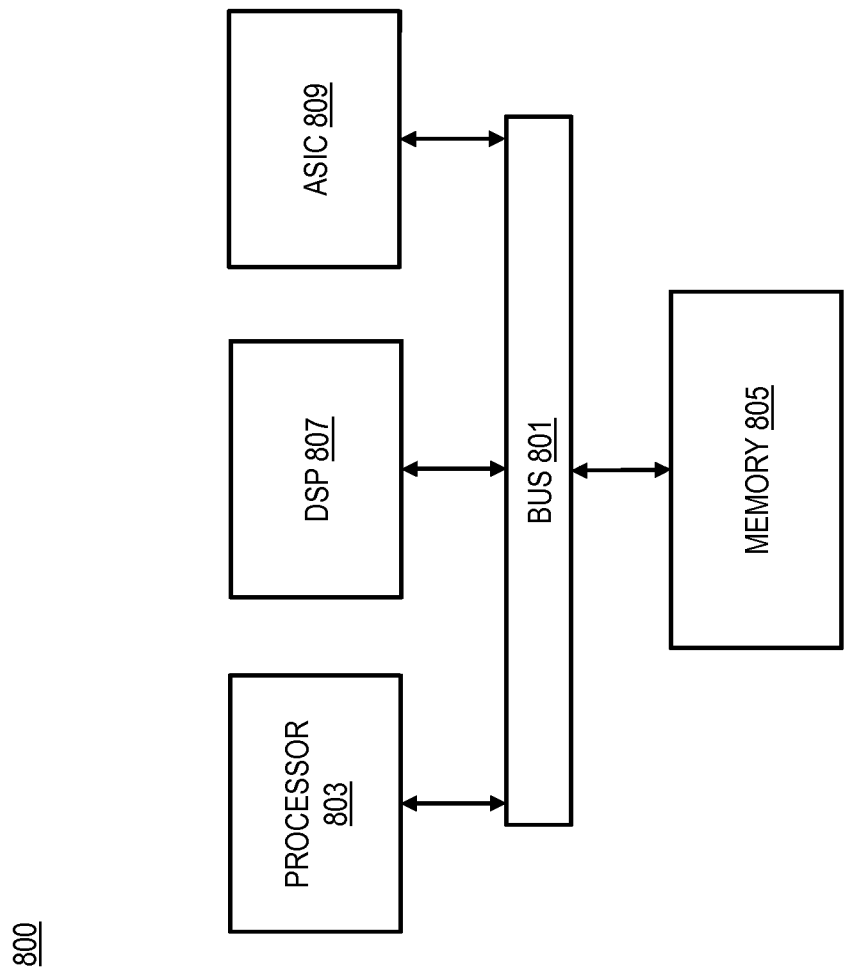
FIG. 8 is a diagram of a chip set that can be used to implement an embodiment of the invention.

FIG. 2 is described with reference to FIG. 3, wherein FIG. 3 shows a flowchart of a process for providing distributed key range management, according to one embodiment. In one embodiment, the key management platform 103 performs the process 300 and is implemented in, for instance, a chip set including a processor and a memory as shown in FIG. 8.

In one embodiment, per step 301 of FIG. 3, the rebalance module 201 rebalances a node 115a-115i or 115j-115z for storing a key value range 117a-117i or 117j-117z by splitting at least one other node from the nodes 115a-115i or 115j-115z, wherein the at least one other node stores at least a portion of the key value range 117a-117i or 117j-117z. For example, a node 115i may be split into nodes 115i and 115i-2 and the key range 117i of node 115i is also split into key ranges 117i and 117i-2, wherein the key range 117i-2 stores a portion of the key value ranges of the key range 117i.

In one embodiment, as shown per step 303 of FIG. 3, the node generator 203 determines respective numbers of nodes 115a-115i or 115j-115z associated with one or more servers 113a-113k. This enables the node generator 203 to assign nodes to servers evenly and to avoid creation of imbalance among the number of nodes 115a-115i or 115j-115z associated with each server 113a-113a.

In one embodiment, per step 305 of FIG. 3, the node generator 203 processes and/or facilitates a processing of the respective numbers of nodes determined in step 303, to select at least one of the one or more servers 113a-113k based, at least in part, on a threshold number. The threshold numbers may be defined at the time of the system setup by the management system of the distributed information environments 111a-111n, by the key management platform 103, or a combination thereof. Each node 115a-115i and 115j-115z has a threshold number (e.g., capacity limit) identifying when a rebalance must be triggered. Upon splitting of a node, a server 113a-113k for the new node can be selected with or without threshold by selecting a server that owns least number of nodes.

In one embodiment, the at least one other node (e.g., 115i-2) split from a node 115i is created by the rebalance module 201 in the at least one server 113i selected by the node generator 203 per step 305.

In one embodiment, each server 113a-113K keeps a list of all the existing nodes 115a-115i and 115j-115z of self and other servers. The node lists can be used by the rebalance module 201 for routing the data requests received from UEs 101a-101n to appropriate nodes. The node lists can also be used by servers for operating on key values when searching for data.

In one embodiment, upon creation of a new node (e.g., 115i-2) in server 113i, per step 307 of FIG. 3, the node list creator/modifier 205 creates one or more node lists for the server 113i, updates lookup lists of other servers, or a combination thereof, with respect to the one or more servers 113a-113k, the at least one server 113i selected by the node generator 203, or a combination thereof.

In one embodiment, as seen per step 309 of FIG. 3, the node list creator/modifier 205 causes, at least in part, a storage of the one or more node lists at the node (e.g., 115i) and the at least one other node 115i-2, wherein any one of the one or more node lists can be used by the rebalance module 201 to initiate a routing of one or more requests between the node 115i and the at least one other node 115i-2 to operate on the key value ranges 117a-117i or 117j-117z (e.g., specifically on the key ranges 117i and 117i-2). In one embodiment, the key value ranges 117a-117i or 117j-117z may be ordered key value ranges (e.g., ordered alphabetically, numerically, etc.)

In one embodiment, the one or more node lists created by the node list creator/modifier 205 may include, at least in part, one or more symmetric pointers between the node 115i and the at least one other node 115i-2, one or more asymmetric pointers between the node 115i and the at least one other node 115i-2, a partial list of the node 115i and the at least one other node 115i-2, a full list of the node 115i and the at least one other node 115i-2, or a combination thereof.

In one embodiment, per step 311 of FIG. 3, the node list creator/modifier 205 receives at least one of the one or more requests exchanged between the node 115i and the at least one other node 115i-2, wherein the at least one request specifies an operation involving the node 115i and the at least one other node 115i-2. Upon receiving the request, per step 313 of FIG. 3, the node list creator/modifier 205 determines a first one of the one or more node lists associated with the node 115i and a second one of the one or more node lists associated with the at least one other node 115i-2. The node list creator/modifier 205 also causes, at least in part, a comparison of the first one of the one or more node lists and the second one of the one or more node lists (per step 315 of FIG. 3). The node list creator/modifier 205 further causes (per step 317 of FIG. 3), at least in part, an update of the first one of the one or more node lists, the second one of the one or more node lists, or a combination thereof based, at least in part, on the comparison.

In one embodiment, per step 319 of FIG. 3, the key management platform 103 receives at least one of the one or more requests, wherein the at least one request operates on at least a portion of one or more key value ranges 117a-117i or 117j-117z (e.g., 117i). Upon receiving the request, per step 321, the request distributor 207 causes, at least in part, a selection of at least one of the one or more node lists associated with the node 115i, the at least one other node 115i-2, or a combination thereof. The request distributor 207 further, per step 323 of FIG. 3, processes and/or facilitates a processing of the at least one node list to route the at least one request to the node 115i, the at least one other node 115i-2, or a combination thereof storing the requested at least a portion of the key value range.

In one embodiment, the request information, the key value ranges, the node lists, any local data used or produced during the rebalancing process, etc. may be stored in the storage 209 that can be accessed by any of the components 201-207 of the key management platform 103.

In one embodiment, the request distributor 207 may select the at least one of the one or more node lists based, at least in part on, a round robin mapping, wherein the round robin mapping is a method of choosing a resource for a task from a list of available resources, for the purposes of load balancing, for example distribution of incoming requests to nodes 115a-115i or 115j-115z by the request distributor 207. Based on the basic round robin algorithm, the request distributor 207 selects a node 115a-115i or 115j-115z that is pointed to by a pointer from a node list, after which the pointer is incremented and if the end of the node list is reached, the process is returned to the beginning of the node list. Round robin selection has a positive characteristic of preventing starvation, as every node 115a-115i or 115j-115z eventually will be chosen by the request distributor 207. In one embodiment, the round robin mapping may be performed by a load balancer. The request distributor 207 runs in each server 113a-113k, selects a proper node for the key, and requests the server that owns the selected node to access the related content.

In one embodiment, the node list creator/modifier 205 may cause, at least in part, a compression of the one or more node lists. The compression process will reduce the storage amount required for storing large node lists on nodes 115a-115i or 115j-115z, on storage 209, on databases 119a-119i or 119j-119z, or a combination thereof.

Figure 4:
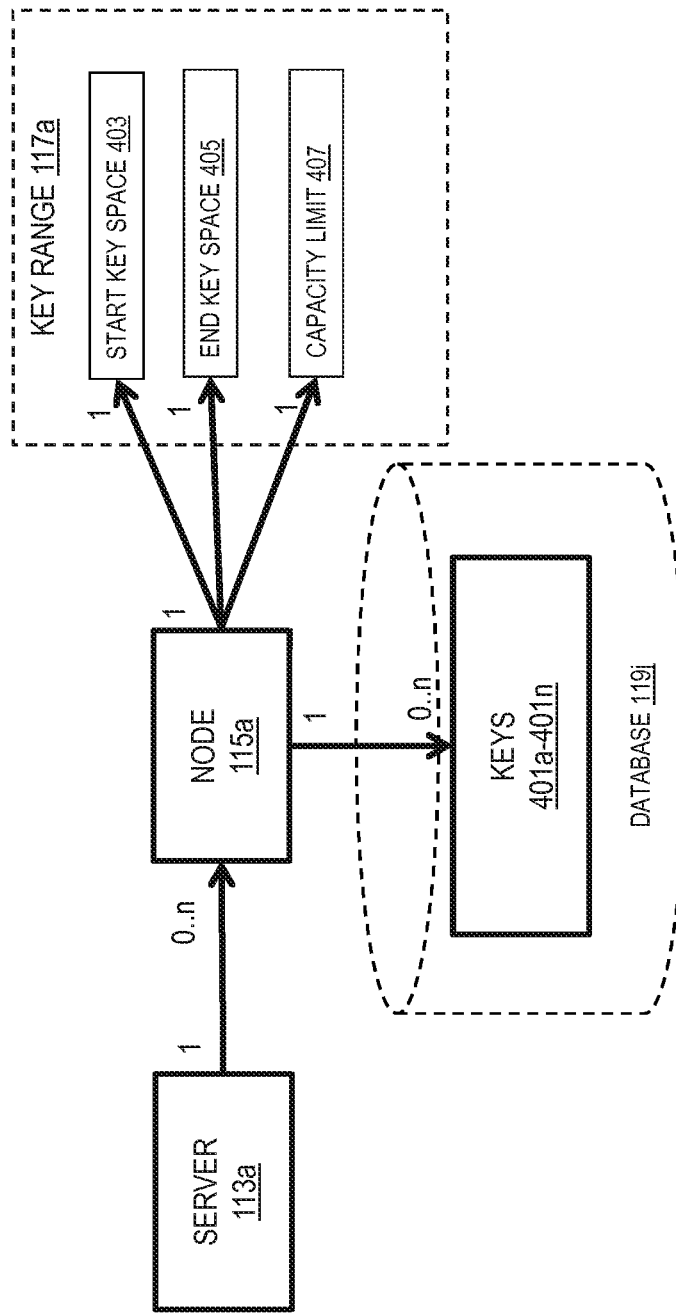
FIG. 4 is a diagram of a relation between the components of a distributed information environment, according to one embodiment.

FIG. 4 is a diagram of relation between the components of a distributed information environment, according to one embodiment. As seen in FIG. 4, a server 113a may own at least 0 to at most N nodes 115a. Similarly, a node 115a may be associated with at least 0 to at most N keys 401a-401 in one or more databases 119i, wherein keys are clustered around key ranges such as 117a. It is noted that the value of N depends on the availability of resources in the distributed information environment 111a-111n.

In one embodiment, the relation between a node 115a and its associated key range 117a is a one-to-one relation meaning that each node 115a is pointing at with one key range 117a.

In one embodiment, a node 115a may be associated with a key range from 1 to 1000, wherein a key range 117a may include information such as a starting address 403 of the key space 1 to 1000 in databases 119a-119i or 119j-119z, in a local storage 209, or a combination thereof. The key range 117a may also include ending address 405 of the key space 1 to 1000 in a database 119a-119i or 119j-119z, in local storage 209, or a combination thereof. The key range 117a may also have a count of keys of amount of storage (e.g. bytes) that each key range takes up in database 119i. Further, the key range 117a may include a capacity limit 407 which assigns a threshold to the size of the key space for keys 401a-401n. This threshold may be used by the rebalance module 201 to determine when the node split must take place. Additionally, a server 113a-113k may also have a lookup structure for nodes in other server so that the server knows where to store and from where to read certain key (or range of keys).

In one embodiment, the distributed information environment 111a is initially equipped with one to N servers 113a-113k and only one node 115a. The user (for example the user of UEs 101a-101n) writes data in databases 119a-119i or 119j-119z, including keys 401a-401n, by storing the data to a servers 113i which will in turn store the data in a database 119p associated with node 115p that is associated with a proper key range for the stored data. In this embodiment, all the keys are stored on node 115a. When the number of keys reach the rebalance limit for node 115a (for example M keys are stored), the node 115a is split by the rebalance module 201 into two nodes 115a and 115a-2.

In one embodiment, each node 115a-115i or 115j-115z may have the capabilities of the key management platform 103. For example, the node 115a reads the key in the middle of the key range (e.g., key in the position M/2), locates a server 113a-113k with the least number of nodes and requests a new node from the located server. Locating a server by a node 115a for storing the new node eliminates the need for centralized management of key ranges, since an existing node 115a requests a new node 115a-2 in another server. Once a new node 115a-2 is generated in another server, half of the key range of node 115a (from the following key to the middle key N/2 to the end of the range) is moved to the new node 115a-2 so that nodes 115a and 115a-2 each store half of the initial key range of node 115a.

Figure 5A:
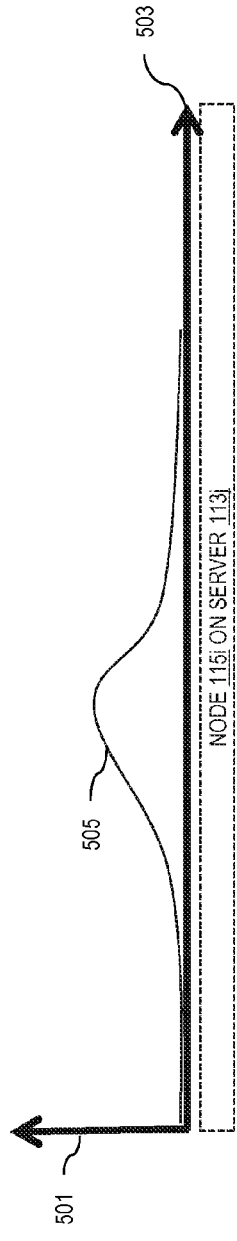
FIGS. 5A-5C are diagrams of node creation and balancing, according to various embodiments.
Figure 5B:
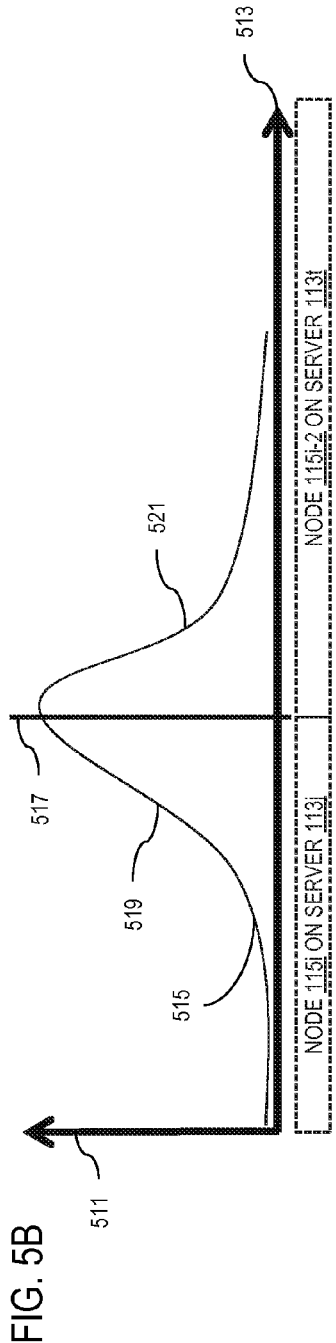
Figure 5C:
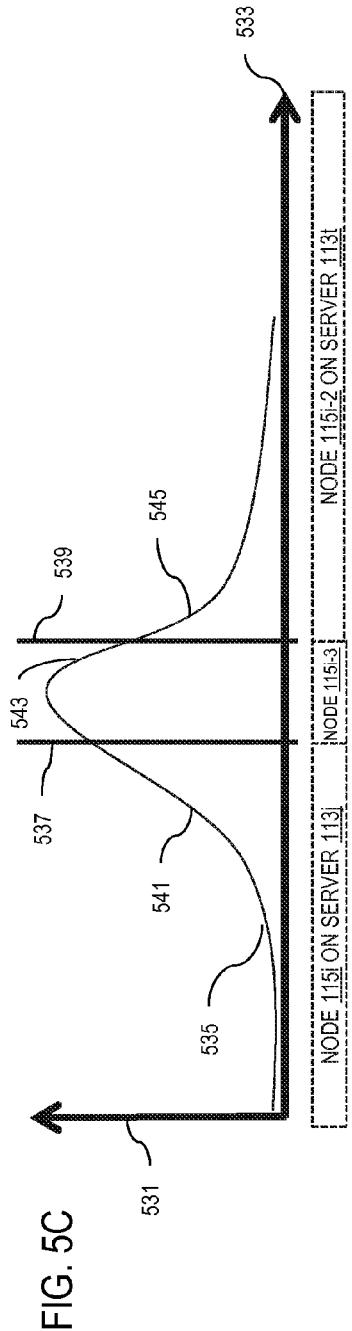

FIGS. 5A-5C are diagrams of node creation and balancing, according to various embodiments. FIG. 5A shows a key distribution curve 505, wherein the vertical axis 501 is the key density (e.g., number of keys) and the horizontal axis 503 shows the key space. It is noted that key distribution depends heavily on the use case and the specific conditions of the system. However, in any case (even with random keys unless the random key generator generates infinitely large keys, which is not possible) there will exist dense areas across the infinite key space. The highest pick of curve 505 shows the highest density of keys. In the example of FIG. 5A, the key space 503 is on a node 115i of a server 113j. This case may show the key space situation at the time when the system is initialized and all the existing keys are stored on one node 115i.

In one embodiment, as the number of keys grows, the number of keys on node 115i reaches the threshold of node 115i (e.g., the number of keys the node 115i is capable of storing). In this case, the node 115i is split by the rebalance module 201 into two nodes 115i and 115i-2. The new node 115i-2 may be stored on the same server 113j as the server for node 115i or on another server 113t. FIG. 5B shows the node splitting process. In FIG. 5B, the vertical axis 511 is the key density (e.g., number of keys) and the horizontal axis 513 shows the key space. As the number of keys increases, the pick point of the key curve 515 grows higher. In such situations the rebalance module 201 splits the key curve 515 into two half curves 519 and 521 as shown by the vertical line 517.

In the embodiment of FIG. 5B, the key range associated with half curve 519 is stored in node 115i of server 113j, while the key range value associated with half curve 521 is stored on the node 115i-2 and the new node 115i-2 is associated with server 113t. As previously explained, each of the nodes 115i and 115i-2 store a node list provided by the node list creator/modifier 205. The node lists are updated by the node list creator/modifier 205 to include information about the new node 115i-2 and the key value range associated with the new node and the node 115i, the new node split from. Following the modification of the node lists, the updated lists are stored on all nodes 115a-115i or 115j-115z by the node list creator/modifier 205.

FIG. 5C shows a situation, wherein the node 115i is split into more than two, because the total number of keys in the key space exceeds the threshold capacity of node 115i and the node 115i-2 which is the first node split from 115i. The node split process may continue multiple times until the number of keys on the original node and its split new nodes meet the limit of the number of keys for each node. In FIG. 5C the vertical axis 531 is the key density (e.g., number of keys) and the horizontal axis 533 shows the key space. In one embodiment, as the number of keys increases, the pick point of the key curve 535 grows higher. In such situations, the rebalance module 201 splits the key curve 535 into three curves 541, 543, and 545 shown by the vertical lines 537 and 539.

In the embodiment of FIG. 5C, the key range associated with curve 541 is stored in node 115i of server 113j, while the key range value associated with curve 545 is stored on the new node 115i-2 wherein the new node 115i-2 is associated with server 113t. Furthermore, the key range associated with curve 543 is stored on node 115i-3, wherein the node 115i-3 may be stored on any available server, for example on a server with the least number of nodes. Again, each of the nodes 115i, 115i-2, and 115i-3 store an updated node list provided by the node list creator/modifier 205.

Figure 6A:
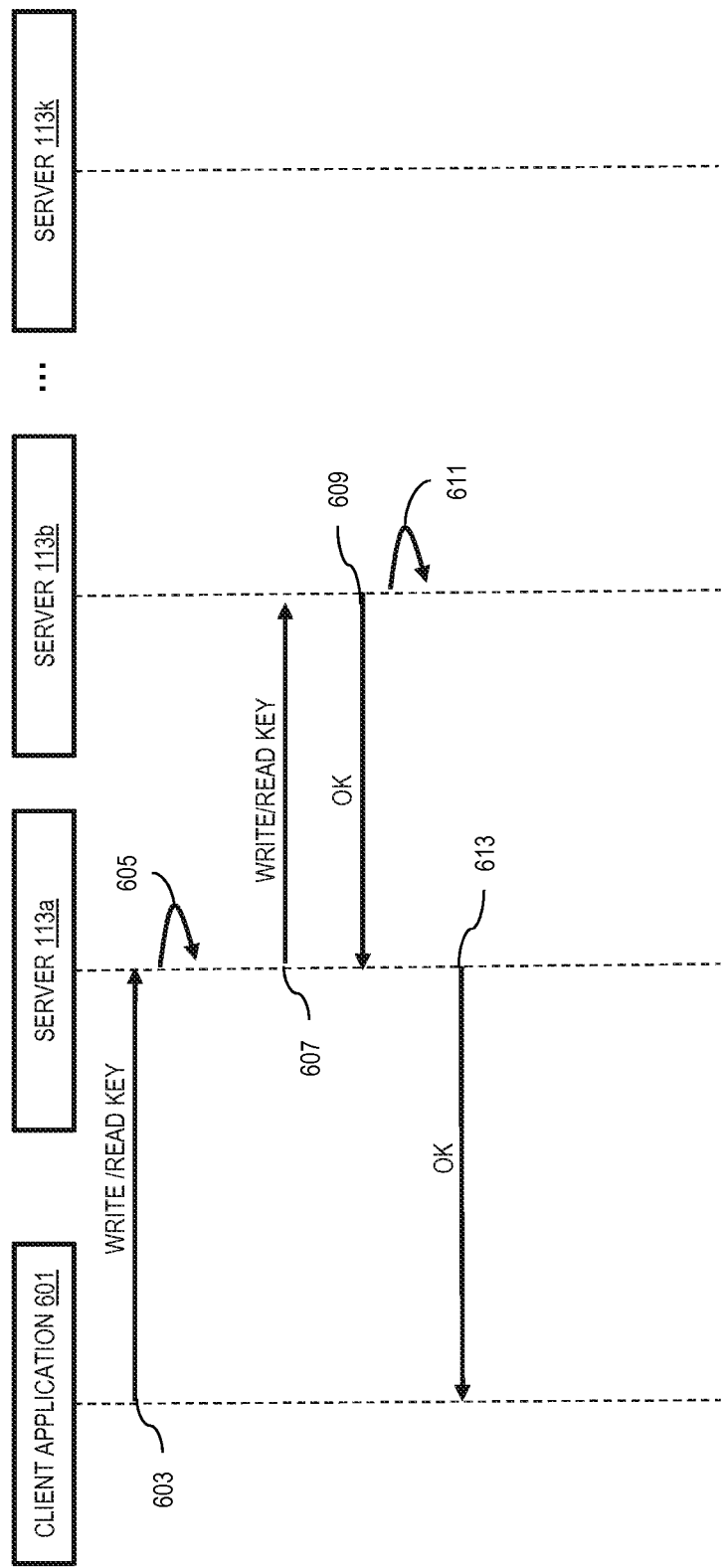
Figure 6B:
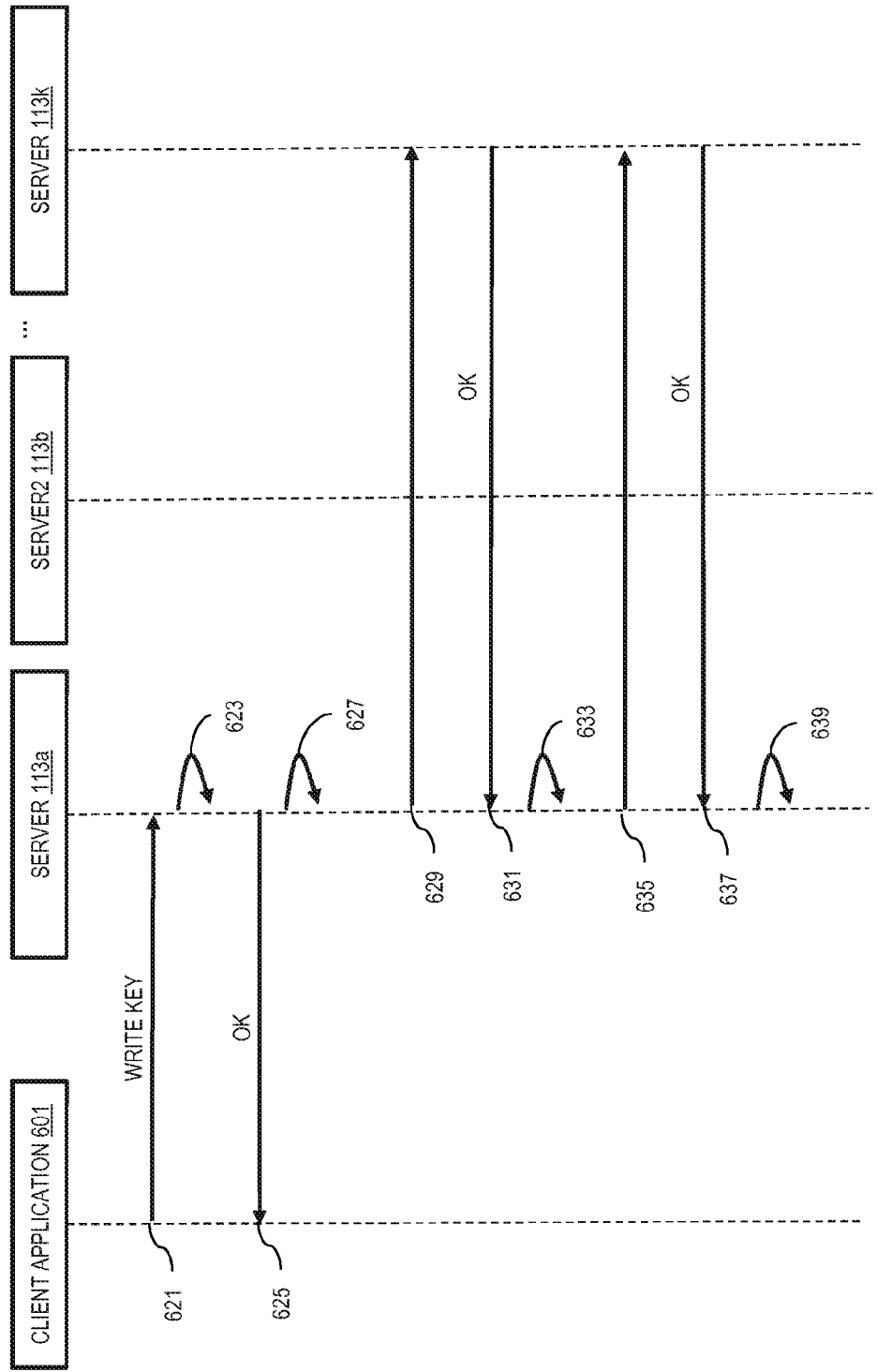

FIGS. 6A-6C are diagrams of sequences for locating nodes, according to various embodiments. In one embodiment, the link between nodes 115a-115i or 115j-115z can be maintained by creating a linked list, in which node 115a points to node 115b, node 115b points to node 115c, etc. and vice versa (each node points to its next and previous node). In this embodiment, node requests originated from any server 113a-113k provide pointers towards other nodes.

In another embodiment, each server 113a-113k maintains a list of nodes it has and whenever a node 115i is split into 115i and 115i-2, the newly generated node 115i-2 stores a reference (e.g., a link) to the remote server 113a-113k where it will be stored.

In one embodiment, a request for reading/writing keys can be sent to any server 113a-113k. Since each server 113a-113k has a list of its own nodes, if the requested keys are local to the server receiving the request, the keys are read/written locally on the local nodes of the server. Otherwise, if the key does not belong to any local key range, the server receiving the request communicates with other servers to read/write keys.

In one embodiment, each server 113a-113k can maintain a full list (or partial lookup table) of nodes in other servers. In this embodiment, any read/write request can be routed to the proper node on the proper server.

It is noted that no centralized lookup table is needed. If server 113a has outdated information about server 113b's nodes, server 113b will respond with a new node list when server 113a tries to read/write from/to server 113b. As previously discussed, this system functions similar to the P2P distributed hash tables. P2P distributed hash tables distribute the table while hot spots are avoided by calculating a hash of a key and using the hash to determine the location for the key and value and as a result does not allow range reads. However, the described features, although similar to the P2P distributed hash table, work on distributing keys based on their ordering which makes the distribution more difficult due to non-uniform distribution.

In the embodiment of FIG. 6A, the client application 601 sends a key read/write request to server 113a per arrow 603. The server 113a, per arrow 605, looks up the node whose key range includes the requested key, for example on server 113b. Per arrow 607, the server 113a sends the read/write request to server 113b and receives approval of server 113b via arrow 609. The server 113a returns the read/write approval received from server 113b to the client application 601, per arrow 613. In one embodiment, if the node on server 113b needs to rebalance, the rebalance module 201 splits the node per arrow 611.

FIG. 6B shows an embodiment wherein the read/write request triggers rebalance of the nodes. In one embodiment, the client application 601 sends a key read/write request to server 113a per arrow 621. The server 113a, per arrow 623, looks up the node whose key range includes the requested key. In this example the related node on server 113a is over limit and therefore the rebalance process is triggered. Per arrow 625, the server 113a sends an approval message to the client application 601, and, per arrow 627, the server 113a uses the server node list to find a server which has the least number of nodes, for example server 113k. Per arrow 629, the node generator 203 adds a new node, split from the old node on the server 113a, to server 113k and receives a message of successful generation of the new node from server 113k per arrow 631. Per arrow 633, the server 113a forwards the read/write request to server 113k, wherein the read/write process will include both servers 113a and 113k. Per arrow 635 the server 113a moves keys from the midpoint of the old node to the new node generated on server 113k and receives a message regarding the receipt of keys from server 113k per arrow 637. In step 639, the server 113a deletes the keys that were moved to server 113k from the old node and sets the endpoint of the old node to the value of the previous midpoint. For example, if the old node on server 113a has a limit of 10,000 keys and it is over the limit (has 10,001 keys) the keys will be divided into two ranges (1 to 5,000) and (5,001 to 10,001). The range (1 to 5,000) is kept on the old node and the range (5,001 to 10,001) is moved to the new node on server 113k. Additionally, the current upper limit of ranges on both old and new nodes is set to 5,000, since each include half the keys of the previous key range on the old node.

It is noted that there is no upper limit of ranges. Each node 115a-115i or 115j-115z has a capacity of X which does not have to change. When half of the keys and contents are moved, the range which node is responsible for is divided in half; however it can still accept new keys. For example, if a node range start key is 0 and end key is 1000, it does not mean that the node holds 1000 keys, but it means that the node is responsible for any keys and values between 0 and 1000. It may have a limit of 500 keys which their values range between 0 and 1000 (e.g., 2, 4, 7, 10, 100, etc.). However, for example, more than half of the keys may belong to the end of the range (e.g., between 900 and 1000), and this may lead to a rebalance trigger. Following rebalance, the node may still have keys such as 2, 4, 7, and 10 in the database but the new distribution eliminates the concentration of keys at the 900 to 1000 range and reduces the total number of keys. Therefore, new keys within the range 0 to 1000 (e.g., 1, 3, 9, etc.) which did not exist before, can be accepted.

FIG. 6C shows the node table update after rebalancing. In one embodiment, the client application 601 sends a key read/write request to server 113a per arrow 641. The server 113a, per arrow 643, looks up the node whose key range includes the requested key, for example on server 113b. Per arrow 645, the server 113a sends the read/write request to server 113b. However, in this example the node on server 113b has been previously split and the range for the requested key has been moved to another server, but the node information of server 113a has not been updated yet. In this case, in response to the read/write request, server 113b per arrow 647 verifies the existence of the key and per step 649 informs server 113a that the requested key does not exist on server 113b anymore and has been moved to server 113k. Upon receiving the information the server 113a sends the read/write request to server 113k per arrow 651 and receives approval of server 113k via arrow 653. The server 113a returns the read/write approval received from server 113k to the client application 601, per arrow 655. Furthermore, server 113a can update its local node lookup list based on the information received from server 113b per step 649.

The following statements show exemplary Java codes for key management. Statement (1) is a logical representation of nodes in each server with a simple data structure:

```
private Vector<Node>nodes=new Vector<Node>( );        (1)
```

Block (2) represents statements for finding a node which is supposed to have the requested key range. If due to rebalancing multiple nodes are responsible for a certain requested key range, the code returns multiple nodes as a result:

```
public Vector<Node> getNodesForKey(ByteArray key) {
  Vector<Node> nodesToReturn = new Vector<Node>;
  for (Node next : nodes) {                           (2)
    if (next.isInRange(key)) nodesToReturn.add(next);
```

```
}
return nodesToReturn;
}
```

Additionally, each node may contain various data such as for example node identifier:
   private UUID identifier;
   Node identifier is not mandatory data, but does simplify communication logic. Key range start for the node:
   private ByteArray start;
   Key range end for the node (null if infinite):
   private ByteArray end;
   Rebalancing to block writes (not reads) to local node:
   private transient ByteArray writeAcceptedUpTo=null;
   Version of communication which gets incremented when end range changes in rebalancing:
   private volatile short version;
   Pointer to a local database when the node is local:
   private transient Table table;
   The comparator used to determine which key is larger. The comparison of numeric values is different from character strings, binary data, etc.:
   private Comparator<ByteArray>comparator;
   The following block (3) of code is the implementation of is InRange method which is referred from nodeList:

```
public boolean isInRange(ByteArray key) {                (3)
if (end == null) return comparator.compare(key, start) >= 0; //
    if there is no end, it's enough to check start key
return comparator.compare(key, start) >= 0 &&
comparator.compare(key, end) < 0;
// check that given key is larger or equal to start range and smaller than the
end range
}
```

The block (4) of code is an example implementation for keys that are ordered using binary values:

```
public class BinaryComparator implements Comparator<ByteArray>,
Serializable {
public int compare(ByteArray o1, ByteArray o2) {
byte[ ] arr1 = o1.get( );
byte[ ] arr2 = o2.get( );
int length = arr1.length > arr2.length ? arr2.length :
arr1.length;                           (4)
for(int i = 0; i < length; i++) {
if(arr1[i] > arr2[i]) return 1;
if(arr1[i] < arr2[i]) return −1;
}
if(arr1.length == arr2.length) return 0;
return arr1.length > arr2.length ? 1 : −1;
}
}
```

The processes described herein for providing distributed key range management may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
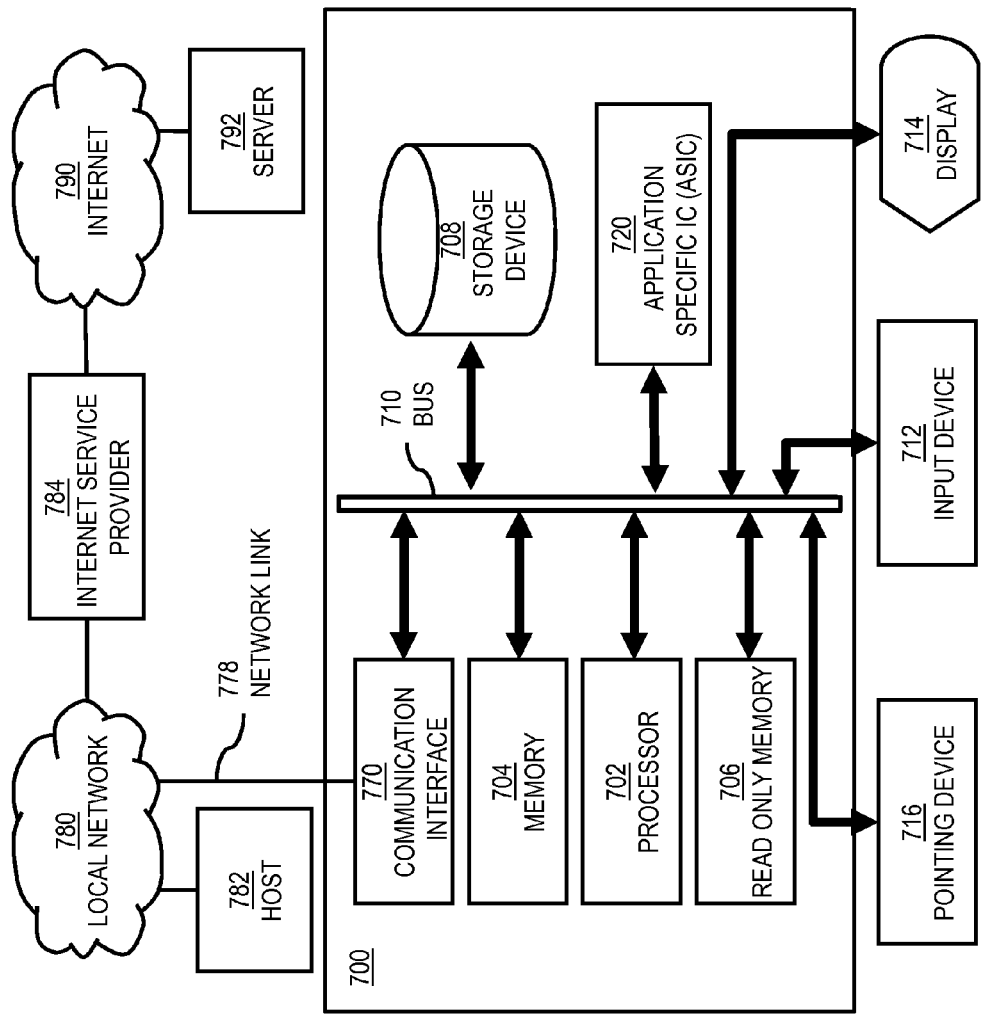
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide distributed key range management as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing distributed key range management.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to providing distributed key range management. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing distributed key range management. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing distributed key range management, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing distributed key range management to the UEs 101a-101n.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer system 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide distributed key range management as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing distributed key range management.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide distributed key range management. The memory 805 also stores the data associated with or generated by the execution of the inventive steps.

Figure 9:
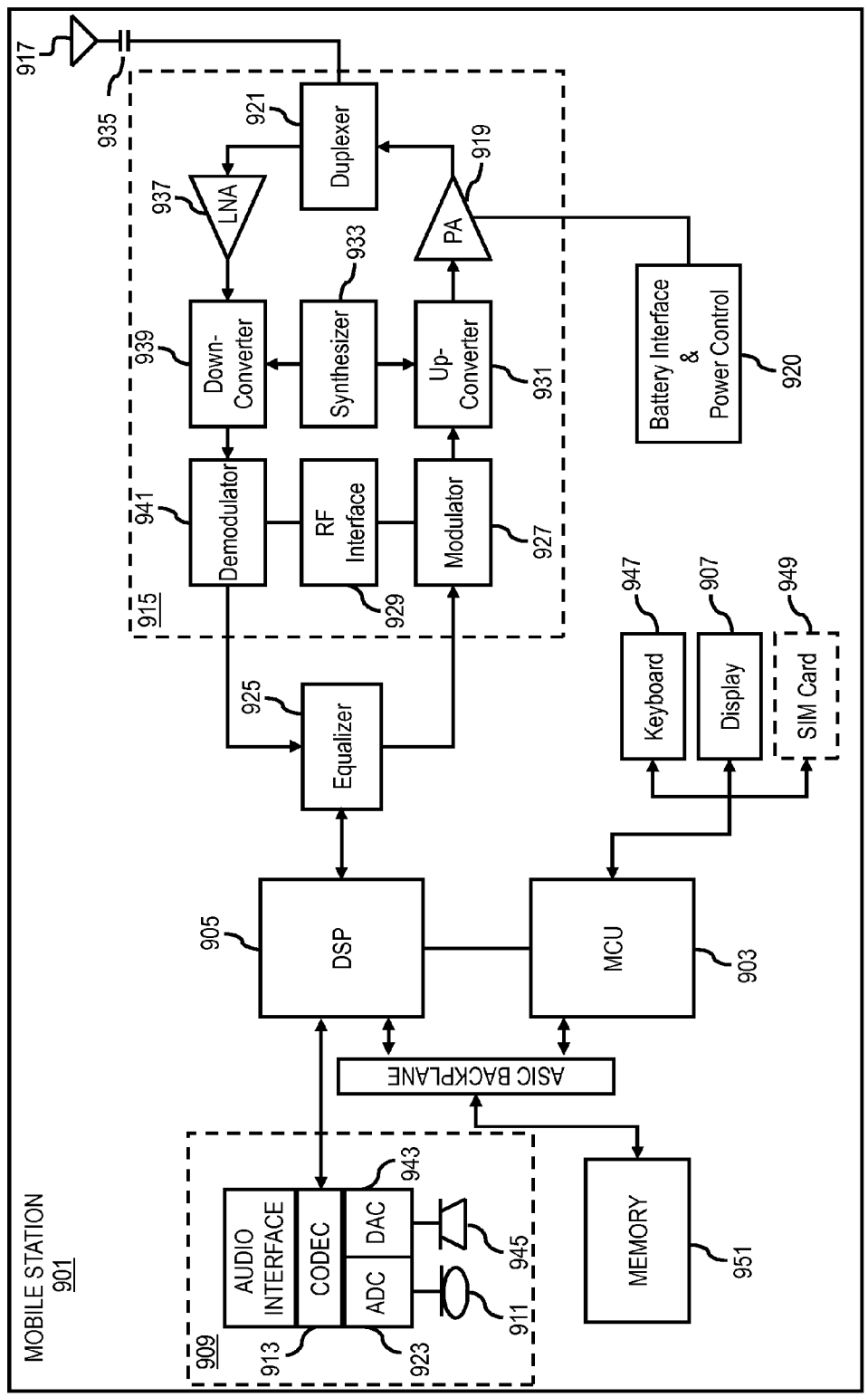
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing distributed key range management. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing distributed key range management. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide distributed key range management. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
at least one determination to rebalance a node for storing a key value range by splitting at least one other node from the node, wherein the at least one other node stores at least a portion of the key value range;
a creation of one or more node lists for the node, the at least one other node, or a combination thereof; and
a storage of the one or more node lists at the node and the at least one other node,
wherein any one of the one or more node lists can be used to initiate a routing of one or more requests between the node and the at least one other node to operate on the key value range,
wherein the (1) data and/or (2) information and/or (3) at least one signal are further based, at least in part, on the following:
at least one of the one or more requests, wherein the at least one request specifies an operation involving the node and the at least one other node;
at least one determination of a first one of the one or more node lists associated with the node and a second one of the one or more node lists associated with the at least one other node;
a comparison of the first one of the one or more node lists and the second one of the one or more node lists; and
an update of the first one of the one or more node lists, the second one of the one or more node lists, or a combination thereof based, at least in part, on the comparison.

2. A method of claim 1, wherein the one or more node lists include, at least in part, one or more symmetric pointers between the node and the at least one other node, one or more asymmetric pointers between the node and the at least one other node, a partial list of the node and the at least one other node, a full list of the node and the at least one other node, or a combination thereof.

3. A method of claim 1, wherein the (1) data and/or (2) information and/or (3) at least one signal are further based, at least in part, on the following:
at least one determination of respective numbers of nodes associated with one or more servers;
a processing of the respective numbers of nodes to select at least one of the one or more servers based, at least in part, on a threshold number; and
a creation of the at least one other node in the at least one selected server.

4. A method of claim 3, wherein the one or more node lists are created and/or stored with respect to the one or more servers, the at least one selected server, or a combination thereof.

5. A method of claim 1,
wherein the at least one of the one or more requests operates on at least a portion of the key value range, and
wherein the (1) data and/or (2) information and/or (3) at least one signal are further based, at least in part, on the following:
a selection of at least one of the first one of the one or more node lists associated with the node, the second one of the one or more node lists associated with the at least one other node, or a combination thereof; and
a processing of the at least one of the first one of the one or more node lists and the second one of the one or more node lists to route the at least one request to the node, the at least one other node, or a combination thereof storing the requested at least a portion of the key value range.

6. A method of claim 5, wherein the selection is based, at least in part, on a round robin mapping.

7. A method of claim 6, wherein the round robin mapping is performed by a load balancer.

8. A method of claim 1, wherein the (1) data and/or (2) information and/or (3) at least one signal are further based, at least in part, on the following:
a compression of the one or more node lists.

9. A method of claim 1, wherein the key value range is an ordered key value range.

10. An apparatus comprising:
at least one processor; and
at least one memory including computer program code for one or more programs,
the at least one memory and the computer program code configured to, with the at least one processor, cause the apparatus to perform at least the following,
determine to rebalance a node for storing a key value range by splitting at least one other node from the node, wherein the at least one other node stores at least a portion of the key value range;
cause, at least in part, a creation of one or more node lists for the node, the at least one other node, or a combination thereof; and
cause, at least in part, a storage of the one or more node lists at the node and the at least one other node,
wherein any one of the one or more node lists can be used to initiate a routing of one or more requests between the node and the at least one other node to operate on the key value range,
wherein the apparatus is further caused to:
receive at least one of the one or more requests, wherein the at least one of the one or more requests specifies an operation involving the node and the at least one other node;
determine a first one of the one or more node lists associated with the node and a second one of the one or more node lists associated with the at least one other node;
cause, at least in part, a comparison of the first one of the one or more node lists and the second one of the one or more node lists; and
cause, at least in part, an update of the first one of the one or more node lists, the second one of the one or more node lists, or a combination thereof based, at least in part, on the comparison.

11. An apparatus of claim 10, wherein the one or more node lists include, at least in part, one or more symmetric pointers between the node and the at least one other node, one or more asymmetric pointers between the node and the at least one other node, a partial list of the node and the at least one other node, a full list of the node and the at least one other node, or a combination thereof.

12. An apparatus of claim 10, wherein the apparatus is further caused to:
determine respective numbers of nodes associated with one or more servers;
process and/or facilitate a processing of the respective numbers of nodes to select at least one of the one or more servers based, at least in part, on a threshold number; and
cause, at least in part, a creation of the at least one other node in the at least one selected server.

13. An apparatus of claim 12, wherein the one or more node lists are created and/or stored with respect to the one or more servers, the at least one selected server, or a combination thereof.

14. An apparatus of claim 10,
- wherein the at least one of the one or more requests operates on at least a portion of the key value range, and
- wherein the apparatus is further caused to:
- cause, at least in part, a selection of at least one of the first one of the one or more node lists associated with the node, the second one of the one or more node lists associated with the at least one other node, or a combination thereof; and
- process and/or facilitate a processing of the at least one of the first one of the one or more node lists and the second one of the one or more node lists to route the at least one request to the node, the at least one other node, or a combination thereof storing the requested at least a portion of the key value range.

15. An apparatus of claim 14, wherein the selection is based, at least in part, on a round robin mapping.

16. An apparatus of claim 15, wherein the round robin mapping is performed by a load balancer.

17. An apparatus of claim 10, wherein the apparatus is further caused to:
- cause, at least in part, a compression of the one or more node lists.

18. An apparatus of claim 10, wherein the key value range is an ordered key value range.

* * * * *